(12) United States Patent
Huang et al.

(10) Patent No.: US 9,761,931 B2
(45) Date of Patent: Sep. 12, 2017

(54) WIRELESS NETWORK DEVICE

(71) Applicant: ZyXEL Communications Corp., New Taipei (TW)

(72) Inventors: Chung-Hsien Huang, Hsinchu (TW); Chih-Ming Huang, Hsinchu County (TW)

(73) Assignee: ZyXEL communications Corp., Hsinchu (TW)

( * ) Notice: Subject to any disclaimer, the term of this patent is extended or adjusted under 35 U.S.C. 154(b) by 0 days.

(21) Appl. No.: 15/138,225

(22) Filed: Apr. 26, 2016

(65) Prior Publication Data

US 2017/0117617 A1    Apr. 27, 2017

(30) Foreign Application Priority Data

Oct. 27, 2015 (TW) .............................. 104135275 A

(51) Int. Cl.
| | |
|---|---|
| *H04M 1/00* | (2006.01) |
| *H01Q 1/24* | (2006.01) |
| *H01Q 9/16* | (2006.01) |
| *H01Q 7/00* | (2006.01) |
| *H01Q 9/04* | (2006.01) |
| *H01Q 5/10* | (2015.01) |
| *H04W 88/08* | (2009.01) |
| *H04B 1/38* | (2015.01) |

(52) U.S. Cl.
CPC .............. *H01Q 1/246* (2013.01); *H01Q 5/10* (2015.01); *H01Q 7/00* (2013.01); *H01Q 9/0407* (2013.01); *H01Q 9/16* (2013.01); *H04W 88/08* (2013.01)

(58) Field of Classification Search
CPC .......... H01Q 1/007; H01Q 5/40; H01Q 21/24; H01Q 21/28

USPC ................ 455/562, 562.1; 343/702, 700 MS
See application file for complete search history.

(56) References Cited

U.S. PATENT DOCUMENTS

| | | | |
|---|---|---|---|
| 7,176,844 B2 | 2/2007 | Chiang et al. | |
| 7,397,425 B2 | 7/2008 | Ranta et al. | |
| 7,696,943 B2 | 4/2010 | Chiang | |
| 9,191,086 B2* | 11/2015 | Pochop | H04B 7/0426 |
| 2013/0207866 A1 | 8/2013 | Shtrom | |
| 2014/0029450 A1* | 1/2014 | Vitek | H04W 16/28 370/252 |

(Continued)

FOREIGN PATENT DOCUMENTS

TW         201145677         12/2011

OTHER PUBLICATIONS

"Office Action of Taiwan Counterpart Application," dated Mar. 23, 2017, p. 1-p. 6.

*Primary Examiner* — Lee Nguyen
(74) *Attorney, Agent, or Firm* — Winston Hsu

(57) ABSTRACT

A wireless network device including a substrate, a plurality of antennas, a central antenna and a radio frequency (RF) transceiving module is provided. The antennas are disposed near an edge of the substrate. The central antenna is disposed near a central point of the substrate. The RF transceiving module is coupled to the antennas and the central antenna. In a first mode of the wireless network device, the RF transceiving module receives and transmits signals through the antennas. In a second mode of the wireless network device, the RF transceiving module receives and transmits the signals through a part of the antennas and the central antenna.

13 Claims, 8 Drawing Sheets

(56) References Cited

U.S. PATENT DOCUMENTS

2014/0313080 A1 10/2014 Smith et al.
2015/0094104 A1* 4/2015 Wilmhoff ............... H01Q 1/241
455/457

* cited by examiner

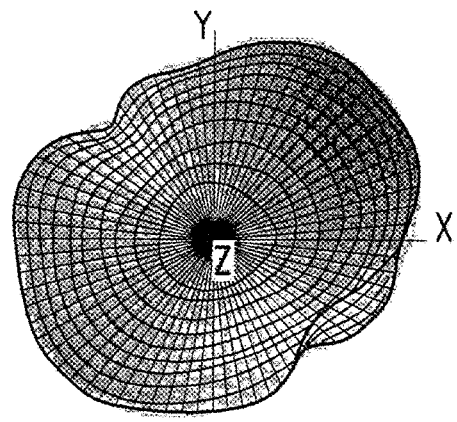 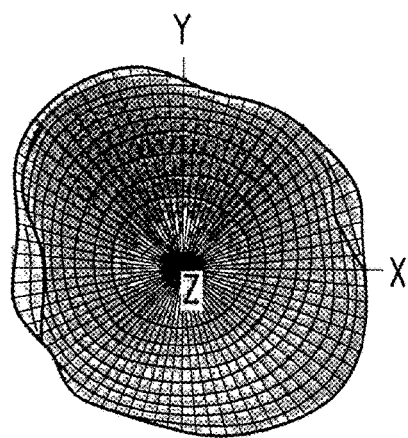
FIG. 4A    FIG. 4B
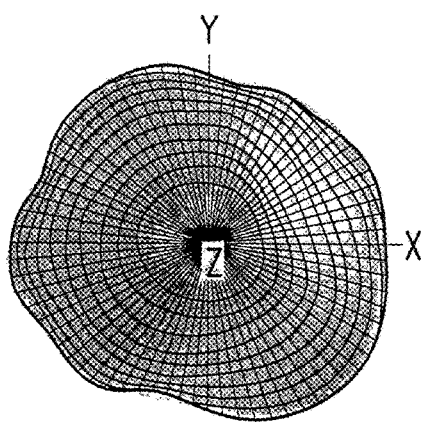 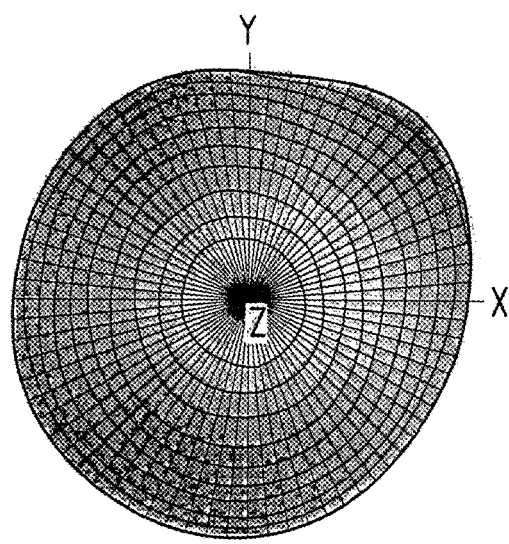
FIG. 4C    FIG. 4D

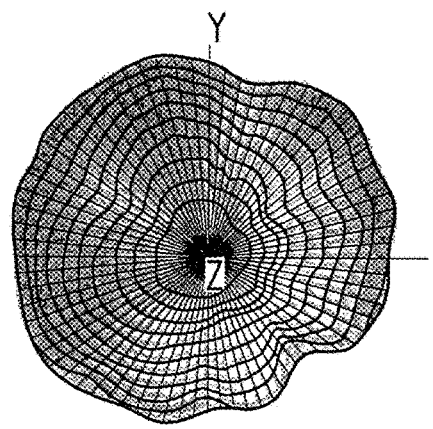
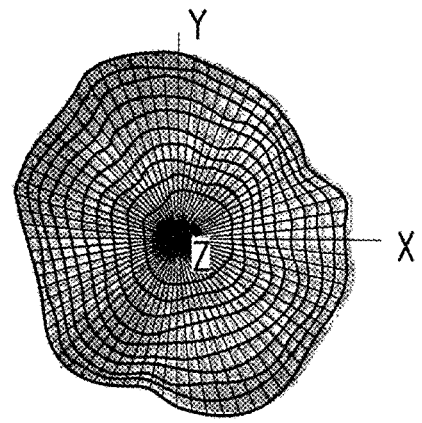
FIG. 5A          FIG. 5B
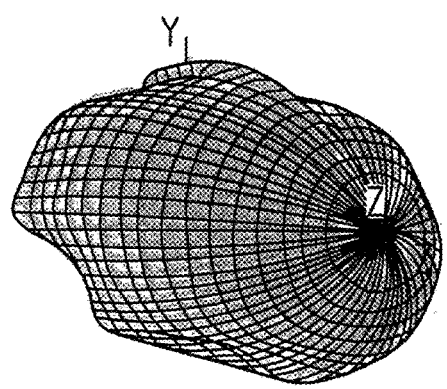
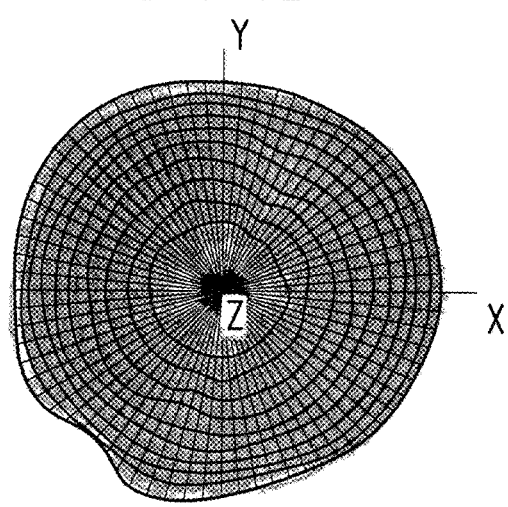
FIG. 5C          FIG. 5D
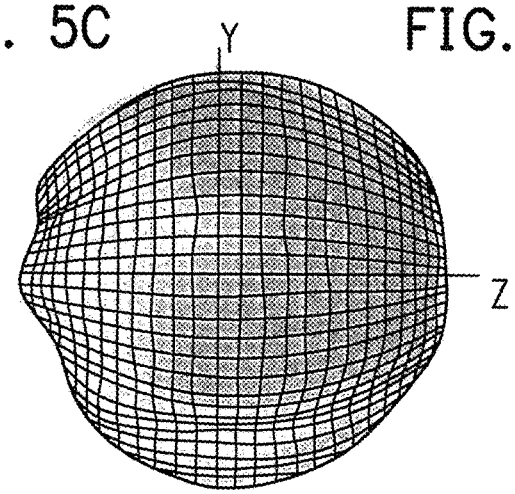
FIG. 5E

WIRELESS NETWORK DEVICE

CROSS-REFERENCE TO RELATED APPLICATION

This application claims the priority benefit of Taiwan application serial no. 104135275, filed on Oct. 27, 2015. The entirety of the above-mentioned patent application is hereby incorporated by reference herein and made a part of this specification.

BACKGROUND OF THE INVENTION

1. Field of the Invention

The invention relates to an electronic device, and more particularly, to a wireless network device.

2. Description of Related Art

People have expected higher connection quality at an access point (AP) of a wireless local area network as user equipments (e.g., smart phones and tablet computers) become more diverse. In general, the most important factor that affects the connection quality of a wireless network signal is the installation position of the AP. Further, the environment for installing the AP also becomes more diverse due to higher user demands.

Furthermore, multiple APs installed in the same space may also cause serious interference problems between the APs. For instance, when the AP is installed in each classroom for E-learning, it is very important to avoid mutual interference between the APs in neighboring classrooms. Aside from that, general Wi-Fi deployments in a hotel is usually by placing access points in hallways, therefore, it is difficult for the APs to provide signal coverage for the entire floor.

In response to market trend and demands, vendors have designed a new AP with smart antenna technology. Nonetheless, in addition to its sophisticated operations, the smart antenna technology is also very complex in both product design and manufacturing phases. Therefore, performance of the smart antenna can be easily influenced by the aforesaid reasons. If a problem occurs, it could be more difficult to solve the problem.

On the other hand, based on the extrinsic factors such as aesthetic requirements, it is more popular for APs to adopt an internal antenna design which provides a single radiation pattern. However, the single radiation pattern provided by internal antennas is usually worse than external antennas. Besides, the single radiation pattern of the internal antennas cannot be changed according to user's installation environments and demands. Accordingly, one of the disadvantages of internal antennas is that it is difficult to dispose antenna elements within the limited space of the housing in order to satisfy diverse installation environments.

SUMMARY OF THE INVENTION

The invention relates to a wireless network device, in which a plurality of first antennas surround a central antenna. Selecting different antenna results in a configurable radiation pattern. Accordingly, the wireless network device can provide the different radiation patterns for different application environments in order to effectively meet the users' demands.

The wireless network device of the invention includes a substrate, a plurality of first antennas, a central antenna and a radio frequency (RF) transceiving module. The first antennas are disposed near an edge of the substrate. The central antenna is disposed near a central point of the substrate. The RF transceiving module is coupled to the first antennas and the central antenna. In a first mode of the wireless network device, the RF transceiving module receives and transmits a first-band signal through the first antennas. In a second mode of the wireless network device, the RF transceiving module receives and transmits the first-band signal through a part of the first antennas and the central antenna.

According to an embodiment of the invention, the central antenna is a first central antenna, and the wireless network device further comprises a second central antenna and a plurality of second antennas. The second antennas are coupled to the RF transceiving module and disposed near the edge of the substrate. In the first mode of the wireless network device, the RF transceiving module receives and transmits a second-band signal through the second antennas. In the second mode of the wireless network device, the RF transceiving module receives and transmits the second-band signal through a part of the second antennas and the second central antenna.

To make the above features and advantages of the present disclosure more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 3A to FIG. 3D and FIG. 4A to FIG. 4D are schematic diagrams illustrating radiation patterns of the wireless network device of FIG. 2 when transceiving signals in the first mode.

FIG. 5A to FIG. 5E and FIG. 6A to FIG. 6E are schematic diagrams illustrating radiation patterns of the wireless network device of FIG. 2 when transceiving signals in the second mode.

DESCRIPTION OF THE EMBODIMENTS

Figure 1:
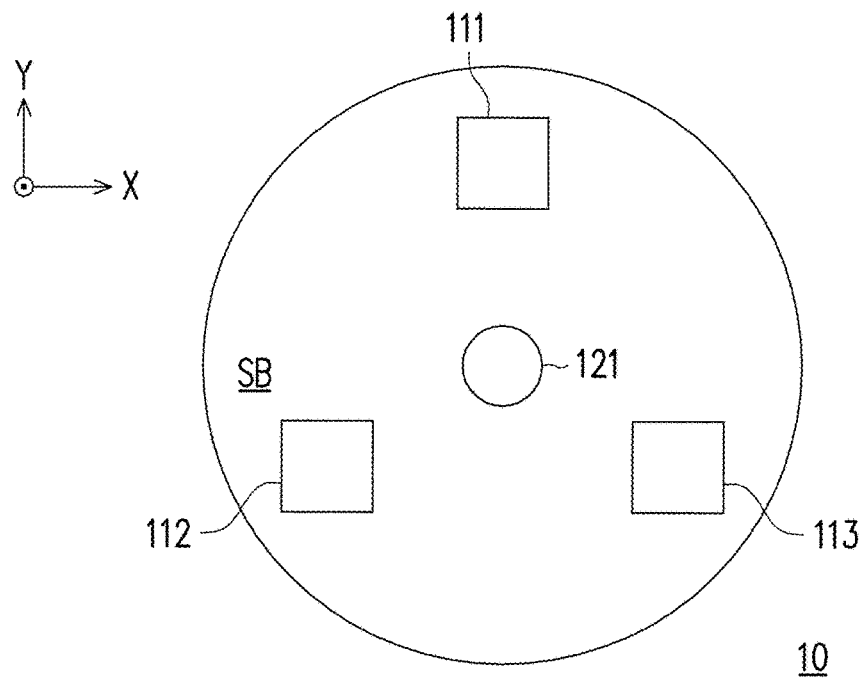
FIG. 1 is a schematic diagram illustrating configuration of a wireless network device according to one embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

In order to satisfy different environment requirements and customized application requirements of a wireless network device for user, the invention is directed to a wireless network device capable of providing various radiation patterns. Accordingly, the user can select the optimal antenna pattern according to an installation position of the wireless network device, so as to improve coverage or performance of wireless network signals.

FIG. 1 is a schematic diagram illustrating configuration of a wireless network device according to one embodiment of the invention. Referring to FIG. 1, a wireless network device 10 includes a substrate SB, first antennas 111 to 113, a first central antenna 121 and a radio frequency (RF) transceiving module (not illustrated). The substrate SB is disposed inside a device body (not illustrated) of the wireless network device 10. The first antennas 111 to 113 are disposed near an edge of the substrate SB. The first central antenna 121 is disposed near a central point of the substrate SB. The RF transceiving module is coupled to the first antennas 111 and 113 and the first central antenna 121. In a first mode of the wireless network device 10, the RF transceiving module receives and transmits a first-band signal through the first antennas 111 to 113. In a second mode of the wireless network device 10, the RF transceiving module receives and transmits the first-band signal through a part of the first antennas 111 to 113 and the first central antenna 121.

In FIG. 1, the first antennas 111 to 113 are evenly distributed on the substrate SB of the device body. For example, in the present embodiment, distances from the central point of the substrate SB to the first antennas 111 to 113 are substantially equal or the same, and distances between each the first antennas 111 to 113 are also substantially equal or the same. A radiation pattern of the single antenna (e.g., one of the first antennas 111 to 113) is more or less defective in response to various factors. Said factors include a radiation characteristic of the antenna, an extending direction of a radiator in the antenna, a shielding effect caused by active components or metal elements inside the device body, and so on.

Therefore, in the present embodiment, in the first mode of the wireless network device 10, the RF transceiving module of the wireless network device 10 receives and transmits the first-band signal commonly through the first antennas 111 to 113. The first antennas 111 to 113 can operate in the first band. Further, when the first antennas 111 to 113 are activated, the radiation patterns of the first antennas 111 to 113 can achieve a complementary effect in each direction on a XY plane. Therefore, in the first mode, a radiation pattern formed by the first antennas 111 to 113 may be evenly distributed in each direction on the XY plane. In other words, the wireless network device 10 can produce the radiation pattern with a more complete shape by the first antennas 111 to 113. As such, user equipments (e.g., mobile electronic devices including smart phones, tablet computers or notebook computers, etc.) in all directions (360 degree) around the substrate SB can establish connection with the wireless network device 10 and have favorable signal quality.

In the second mode of the wireless network device 10, the RF transceiving module of the wireless network device 10 receives and transmits the first-band signal through a part of the first antennas 111 to 113 and the first central antenna 121. For example, the RF transceiving module receives and transmits the first-band signal through the first antennas 112 and 113 and the first central antenna 121 while the first antenna 111 is maintained in a disabled state. The first central antenna 121 is also operable in the first band in addition to the first antennas 111 to 113, and a radiation pattern of the first central antenna 121 is mainly focused in a Z-axis direction.

Moreover, when the first antennas 112 and 113 and the first central antenna 121 are activated, the first antenna 112 and 113 surrounded the first central antenna 121 can cause the radiation pattern originally focused in the Z-axis to be distributed above the XY plane more evenly. In other words, as guided by the radiation pattern of the first central antenna 121, the radiation patterns generated by the first antennas 112 and 113 can cause the radiation pattern of the first central antenna 121 to be evenly distributed on a horizontal space in the Z-axis direction. That is, in the second mode, the wireless network device 10 can produce the radiation pattern towards a normal line of the substrate SB and evenly distributed above the XY plane by the first central antenna 121 and the first antennas 112 and 113. Accordingly, the user equipments located in a normal direction of substrate SB can all establish the connections with the wireless network device 10 and have favorable signal quality.

It should be noted that, in the embodiment of FIG. 1, the number of the first antennas 111 to 113 is three, but the invention is not limited thereto. Those ordinarily skilled in the art may increase or decrease the number of the first antennas in the wireless network device based on above configuration concept.

Figure 2:
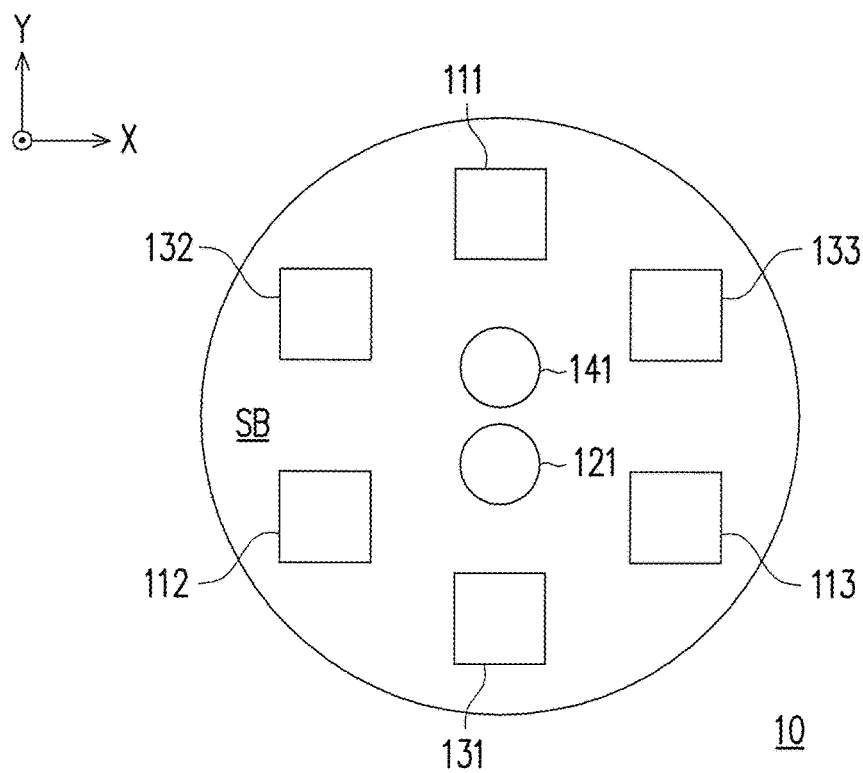
FIG. 2 is a schematic diagram illustrating configuration of a wireless network device according to another embodiment of the invention.

FIG. 2 is a schematic diagram illustrating configuration of a wireless network device according to another embodiment of the invention. Referring to FIG. 2, the wireless network device 10 of FIG. 2 further includes second antennas 131 to 133 and a second central antenna 141 as compared to the embodiment of FIG. 1. Similar with the first antennas 111 to 113, the second antennas 131 to 133 are disposed near the edge of the substrate SB. Further, the second antennas 131 to 133 and the first antennas 111 to 113 are alternately disposed on the substrate SB. In other words, in the present embodiment, the first antennas 111 to 113 and the second antennas 131 to 133 are both disposed on the substrate SB. Further, the first antennas 111 to 113 and the second antennas 131 to 133 are located on the circumference of a circle whose center is the central point of the substrate SB. Furthermore, the first antennas 111 to 113 are not adjacent to one another and the second antennas 131 to 133 are not adjacent to one another either. Also, included angles formed by two lines started from the center (i.e., the central point of the substrate SB) to any adjacent first antenna and second antenna (e.g., the first antenna 111 and the second antenna 133) are substantially equal. On the other hand, the second central antenna 141 is also disposed near the central point of the substrate SB similar with the first central antenna 121.

In the present embodiment, the second antennas 131 to 133 and the second central antenna 141 are coupled to the RF transceiving module of the wireless network device 10. In the first mode of the wireless network device 10, the RF transceiving module receives and transmits a second-band signal through the second antennas 131 to 133. In the second mode of the wireless network device 10, the RF transceiving module receives and transmits the second-band signal through a part of the second antennas 131 to 133 and the second central antenna 141 (e.g., the second antennas 132 and 133 and the second central antenna 141 are enabled while the second antenna 131 is disabled). In the present embodiment, the wireless network device 10 may be a network access point of a wireless local area network, and the first-band signal and the second-band signal may be a wireless local area network signal compatible with WiFi standard. The first-band signal is in a first band, and the second-band signal is in a second band. The first band and the second band are not overlapping with each other, and a frequency of the first band is different from a frequency of the second band. For example, the first band may be 5 GHz band defined in WiFi standard, and the first band includes a plurality of channels each having a frequency close to 5 GHz and a bandwidth of 40 MHz. The second band may be 2.4 GHz band defined in WiFi standard, and the second band includes a plurality of channels each having a frequency close to 2.4 GHz and a bandwidth of 20 MHz or 40 MHz.

On the other hand, in order to lower a mutual interference between the first antennas 111 to 113 and the second antennas 131 to 133 (e.g., to prevent the first antennas 111 to 113 from influenced by the second antennas 131 to 133 when transceiving the first-band signal), the first antennas 111 to 113 and the second antennas 131 to 133 may be implemented by different antenna types, respectively. For example, in the present embodiment, the first antennas 111 to 113 are loop antennas, and the second antennas 131 to 133 are planar inverted-F antennas (PIFAs). The first central antenna 121 and the second central antenna 141 are dipole antennas, but the invention is not limited to the above.

Further, in one embodiment, each of the first antennas 111 to 113 and the first central antenna 121 of FIG. 1 may also be constituted by a dual band antenna. As such, the wireless network device 10 of FIG. 1 can provide a transceiving capability of a dual band wireless local area network similar to the embodiment of FIG. 2. By analogy, in another embodiment, each of the first antennas 111 to 113, the second antennas 131 to 133, the first central antenna 121 and the second central antenna 141 in FIG. 2 may also be constituted by the dual band antenna. Further, the two bands covered by the first central antenna 121 are corresponding to the two bands covered by the first antennas 111 to 113, and the two bands of the second central antenna 141 are corresponding to the two bands covered by the second antennas 131 to 133. Accordingly, the wireless network device 10 in FIG. 2 can receive and transmit the wireless local area network signals in non-overlapping bands. However, the invention is not limited to the above configuration, which may be selectively implemented by those applying the wireless network device 10 based on actual requirements.

Figure 3A:
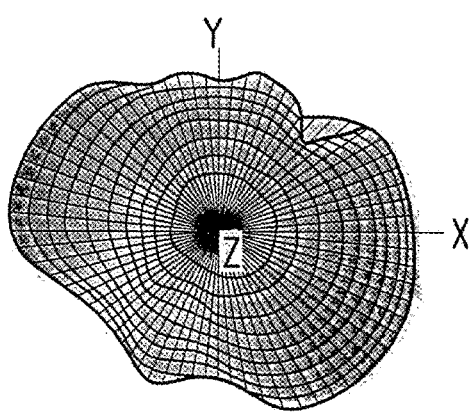
Figure 3B:
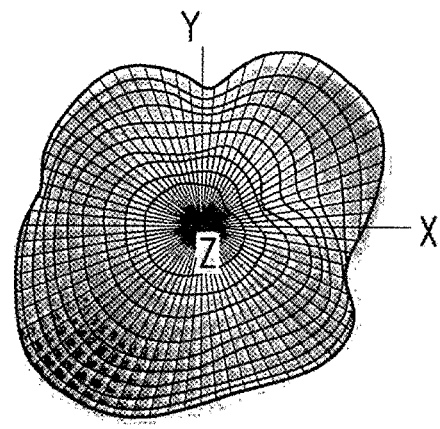
Figure 3C:
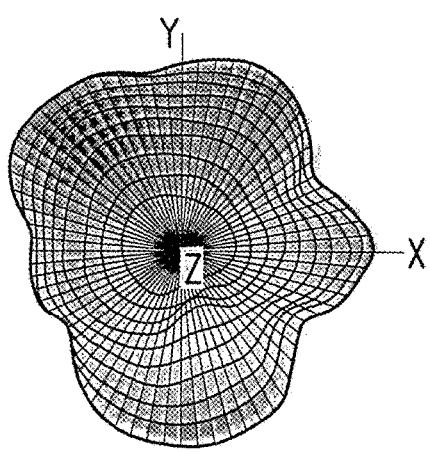

FIG. 3A to FIG. 3D and FIG. 4A to FIG. 4D are schematic diagrams illustrating radiation patterns of the wireless network device of FIG. 2 when transceiving signals in the first mode. In FIG. 3A to FIG. 3D and FIG. 4A to FIG. 4D, a XY plane composed of a X-axis and a Y-axis is parallel to the substrate SB of the device body in the wireless network device 10, and a Z-axis direction is the normal direction of the substrate SB. Further, FIG. 3A is a schematic diagram illustrating the radiation pattern of the first antenna 112 when the wireless network device is in the first mode. FIG. 3B is a schematic diagram illustrating the radiation pattern of the first antenna 113 when the wireless network device is in the first mode. FIG. 3C is a schematic diagram illustrating the radiation pattern of the first antenna 111 when the wireless network device is in the first mode.

Figure 3D:
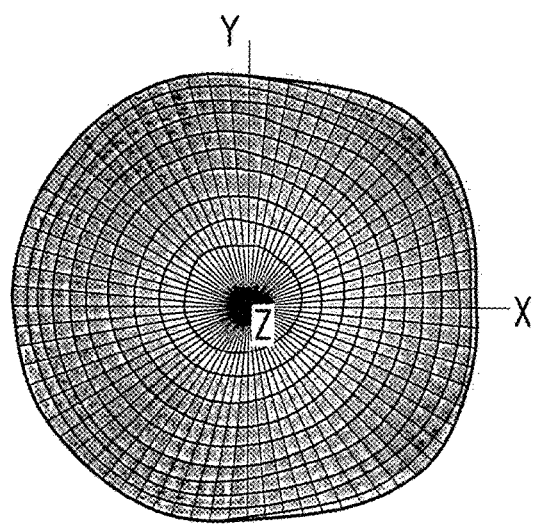

Furthermore, FIG. 3D is a schematic diagram illustrating the radiation pattern of the wireless network device when transceiving the first-band signal in the first mode by using the first antennas 111 to 113 simultaneously. In view of FIG. 3A to FIG. 3C, if only one of the first antennas 111 to 113 is used for transceiving the first-band signal, the radiation pattern of the single first antenna cannot be evenly distributed in all directions on the XY plane. That is to say, the radiation pattern simply generated by one of the first antennas 111 to 113 cannot provide favorable gain in all directions of the wireless network device. Furthermore, in FIG. 3D, if all of the first antennas 111 to 113 are used simultaneously for transceiving the first-band signal, the radiation pattern combined by using the first antennas 111 to 113 may provide favorable gain in all directions on the XY plane (i.e., within 360-degree space around the wireless network device).

FIG. 4A to FIG. 4D are used to describe the radiation patterns of the second antennas 131 to 133 for transceiving the second-band signal in the first mode. FIG. 4A is a schematic diagram illustrating the radiation pattern of the second antenna 133 when the wireless network device is in the first mode. FIG. 4B is a schematic diagram illustrating the radiation pattern of the second antenna 132 when the wireless network device is in the first mode. FIG. 4C is a schematic diagram illustrating the radiation pattern of the second antenna 131 when the wireless network device is in the first mode. FIG. 4D is a schematic diagram illustrating the radiation pattern of the wireless network device when transceiving the second-band signal in the first mode by using the second antennas 131 to 133 simultaneously. In view of FIG. 4A to FIG. 4C, as similar to the schematic diagrams of the radiation patterns of the first antennas 111 to 113 shown in FIG. 3A to FIG. 3C, if only one of the second antennas 131 to 133 is used for transceiving the second-band signal, the radiation pattern of the single second antenna cannot be evenly distributed in all directions on the XY plane. In FIG. 4D, if all the second antennas 131 to 133 are used simultaneously for transceiving the second-band signal, the radiation pattern combined by using the second antennas 131 to 133 may provide favorable gain in all directions on the XY plane.

FIG. 5A to FIG. 5E and FIG. 6A to FIG. 6E are schematic diagrams illustrating radiation patterns of the wireless network device of FIG. 2 when transceiving signals in the second mode. FIG. 5A is a schematic diagram illustrating the radiation pattern of the first antenna 112 when the wireless network device is in the second mode. FIG. 5B is a schematic diagram illustrating the radiation pattern of the first antenna 113 when the wireless network device is in the second mode. FIG. 5C is a schematic diagram illustrating the radiation pattern of the first central antenna 121 when the wireless network device is in the second mode. FIG. 5D is a schematic diagram illustrating the radiation pattern of the wireless network device (in a top view of the XY plane) when transceiving the first-band signal in the second mode by using the first antennas 112 and 113 and the first central antenna 121 simultaneously. FIG. 5E is a schematic diagram illustrating the radiation pattern of the wireless network device (in a side view) when transceiving the first-band signal in the second mode by using the first antennas 112 and 113 and the first central antenna 121 simultaneously.

In view of FIG. 5A and FIG. 5B, if only one of the first antennas 112 and 113 is used for transceiving the first-band signal, the radiation pattern of the single first antenna mainly extends towards directions parallel to the XY plane. Further, in view of FIG. 5C, if only the first central antenna 121 is used for transceiving the first-band signal, the radiation pattern of the first central antenna 121 extends towards the Z-axis direction. Furthermore, in FIG. 5D and FIG. 5E, if the first antennas 112 and 113 and the first central antenna 121 are used simultaneously for transceiving the first-band signal, the radiation pattern combined by using the first antennas 112 and 113 and the first central antenna 121 extends towards the Z-axis direction. Meanwhile, after comparing the radiation pattern combined in FIG. 5E with the radiation pattern formed by using only the first central antenna 121 in FIG. 5C, it can be known that the radiation pattern combined in FIG. 5E can also provide a more favorable gain in XY-axis direction in addition to extension towards the Z-axis.

Figure 6A:
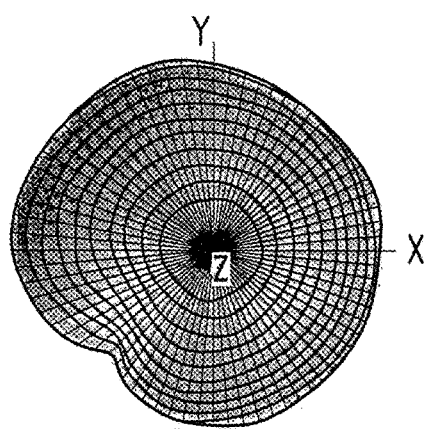
Figure 6B:
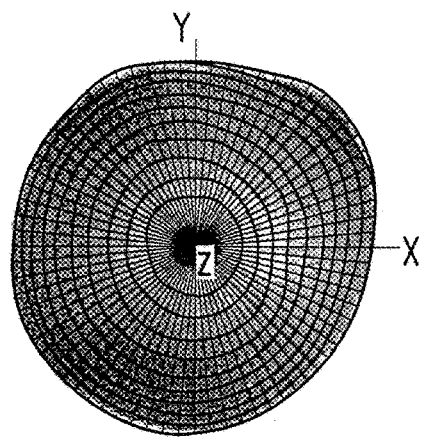
Figure 6C:
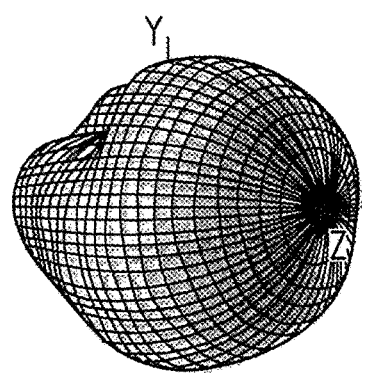
Figure 6D:
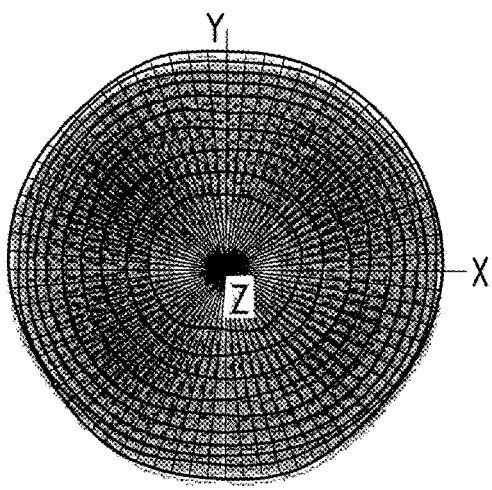
Figure 6E:
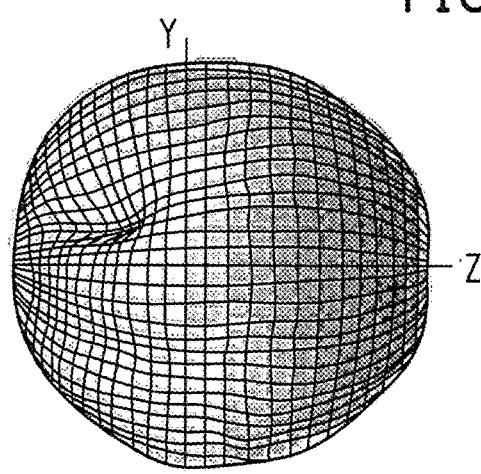

FIG. 6A is a schematic diagram illustrating the radiation pattern of the second antenna 133 when the wireless network device is in the second mode. FIG. 6B is a schematic diagram illustrating the radiation pattern of the second antenna 132 when the wireless network device is in the second mode. FIG. 6C is a schematic diagram illustrating the radiation pattern of the second central antenna 141 when the wireless network device is in the second mode. FIG. 6D is a schematic diagram illustrating the radiation pattern of the wireless network device (in a top view of the XY plane) when transceiving the second-band signal in the second mode by using the second antennas 133 and 132 and the second central antenna 141 simultaneously. FIG. 6E is a schematic diagram illustrating the radiation pattern of the wireless network device (in a side view) when transceiving the second-band signal in the second mode by using the second antennas 132 and 133 and the second central antenna 141 simultaneously.

In view of FIG. 6A and FIG. 6B, if only one of the second antennas 132 and 133 is used for transceiving the second-band signal, the radiation pattern of one second antenna mainly expands towards directions parallel to the XY plane. Further, in view of FIG. 6C, if only the second central antenna 141 is used for transceiving the second-band signal, the radiation pattern of the second central antenna 141 extends towards the Z-axis direction. Furthermore, in FIG. 6D and FIG. 6E, if the second antennas 132 and 133 and the second central antenna 141 are used simultaneously for transceiving the second-band signal, the radiation pattern combined by using the second antennas 132 and 133 and the second central antenna 141 extends towards the Z-axis direction. Meanwhile, after comparing the radiation pattern with FIG. 6E and FIG. 6C, it can be known that the radiation pattern in FIG. 6E can also provide a more favorable gain in XY-axis direction in addition to extension towards the Z-axis.

In brief, the wireless network device 10 can combine and generate the different radiation patterns by switching the antennas when transceiving the signals. Accordingly, the user can adjust the radiation pattern of the wireless network device 10 according to the installation position of the wireless network device 10, so that the radiation pattern of the wireless network device 10 can match to a use area of the user. For instance, FIG. 7A and FIG. 7B are schematic diagrams illustrating a relationship between the installation position and the radiation pattern of the wireless network device according to one embodiment of the invention.

Figure 7A:
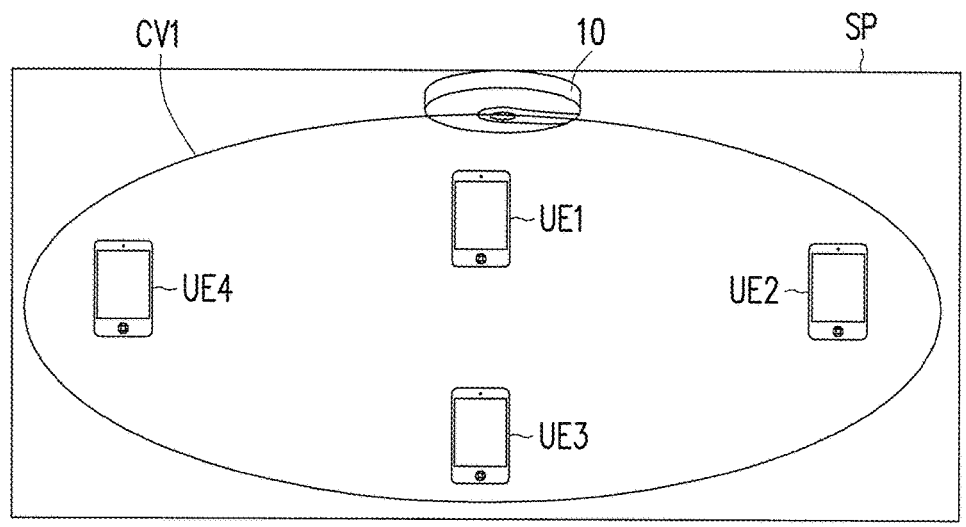
FIG. 7A and FIG. 7B are schematic diagrams illustrating a relationship between the installation position and the radiation pattern of the wireless network device according to the embodiments of the invention.

FIG. 7A illustrates one embodiment in which the wireless network device 10 is installed on a ceiling of a space. Referring to FIG. 7A, when the wireless network device 10 is disposed on a ceiling of a space SP, the wireless network device 10 may be switched to the first mode, so as to use the first mode to receive and transmit the first-band signal or the second-band signal. The radiation pattern in the first mode may be smoothly distributed in each direction on the XY plane (i.e., the radiation pattern can extend towards the surrounding of the wireless network device 10). Accordingly, the wireless network device 10 in the first mode can generate a signal coverage CV1 in FIG. 7A so that each of user equipments UE1 to UE4 in the space SP can be included in the signal coverage CV1 of the wireless network device 10.

Figure 7B:
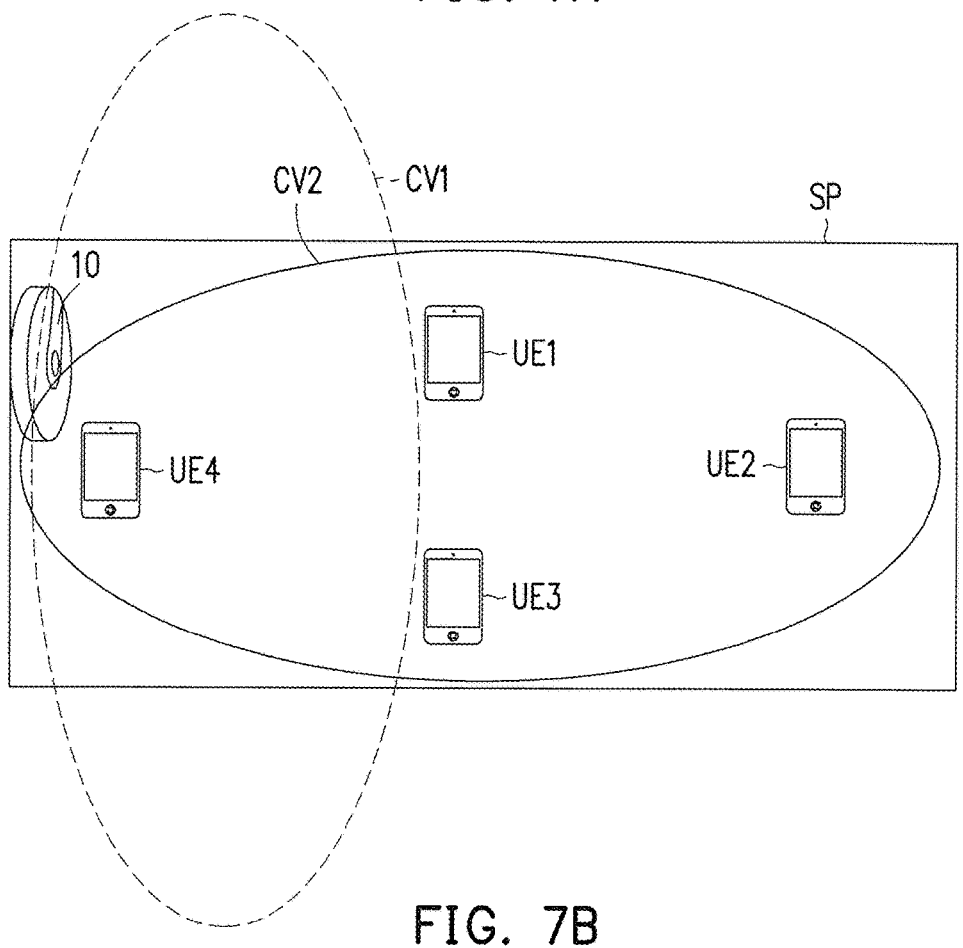

On the other hand, FIG. 7B illustrates one embodiment in which the wireless network device 10 is installed on a wall of the space. When the installation position cannot be on the ceiling in the space SP (e.g., as shown in FIG. 7A) as expected due to environmental influences, the wireless network device 10 may be installed on a wall of the space SP. However, if the wireless network device 10 still uses the first mode to receive and transmit the first-band signal or the second-band signal, the signal coverage CV1 (illustrated in dashed line) of the wireless network device 10 cannot fully cover the space SP.

In other words, if the wireless network device 10 still covers area CV1 when the wireless network device 10 is installed on the wall, some user equipments (e.g., the user equipments UE1 and UE3) may have poor signal quality and some user equipments (e.g., the user equipment UE2) may fail to establish the connection with the wireless network device 10. Worth yet, the signal coverage CV1 of the wireless network device 10 in FIG. 7 exceeds a scope of the space SP (i.e., a radiant energy of the wireless network device 10 will penetrate the ceiling and the floor of the space SP). In this case, the signals transceived by the wireless network device 10 (e.g., the first-band signal and the second-band signal) may cause interferences to wireless network devices installed in other floors.

Therefore, for allowing the signal coverage of the wireless network device 10 to match a current environmental status, when the wireless network device 10 is disposed on the wall of the space SP, the wireless network device 10 may be switched to the second mode, so as to use the second mode to receive and transmit the first-band signal or the second-band signal. The radiation pattern of the wireless network device 10 in the second mode is directed towards the Z-axis direction (i.e., the radiation pattern can extend towards the front of the wireless network device 10). Accordingly, the wireless network device 10 in the second mode can generate a signal coverage CV2 in FIG. 7B. As such, each of the user equipments UE1 to UE4 in the space SP may be included in the signal coverage CV2 of the wireless network device 10 while preventing the signal from penetrating the floor to thereby cause signal interference to the other floors.

Figure 8:
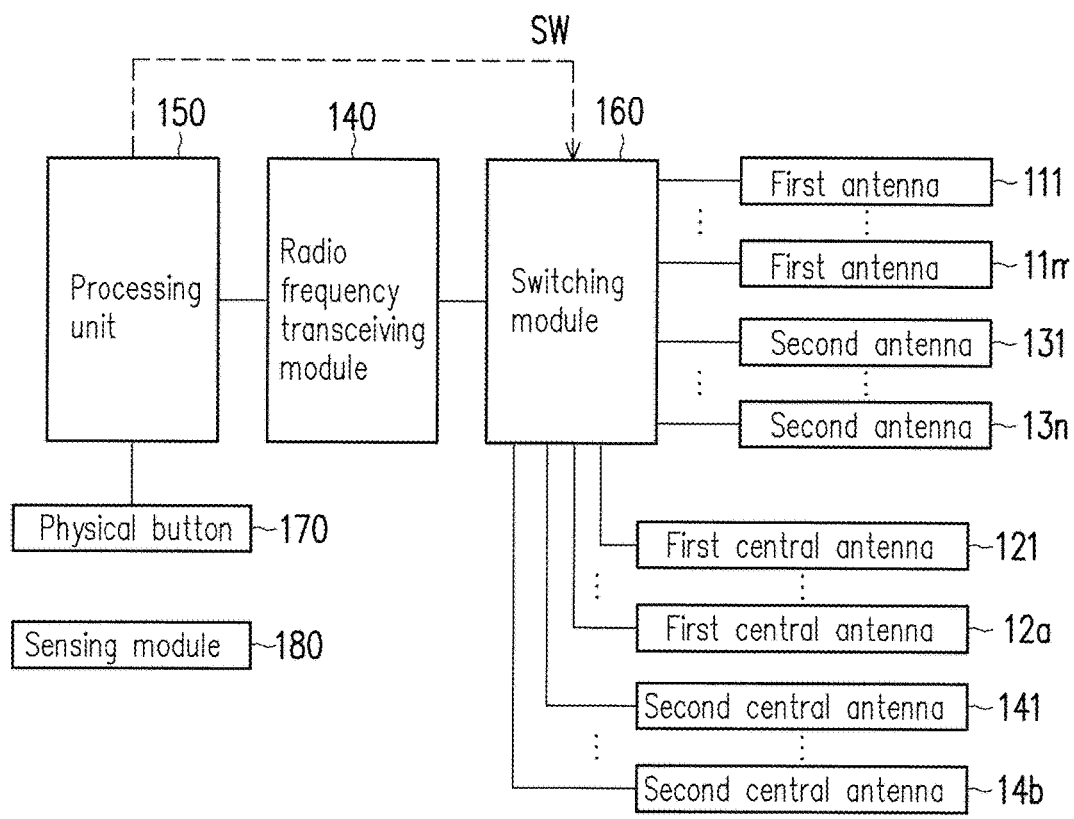
FIG. 8 is a functional block diagram illustrating a wireless network device according to one embodiment of the invention.

FIG. 8 is a functional block diagram illustrating a wireless network device according to one embodiment of the invention. Referring to FIG. 8, in addition to aforesaid device body, first antennas 111 to 11m (in the embodiment of FIG. 2, m=3), second antennas 131 to 13n (in the embodiment of FIG. 2, n=3), at least one central antenna (e.g., the first central antenna 121 and the second central antenna 141) and a RF transceiving module 140, the wireless network device 10 further includes a processing unit 150, a switching module 160, and a physical button 170.

It is worth mentioning that, although the numbers of the first central antenna and the second central antenna are both one in the embodiments of FIG. 1 and FIG. 2, but the invention is not limited thereto. For instance, in FIG. 8, the at least one central antenna includes first central antennas 121 to 12a and second central antennas 141 to 14b, where a and b are positive integers greater than one. In other words, the wireless network device 10 may be disposed with one or more first central antennas and may be disposed with one or more second central antennas.

Referring to FIG. 8, the switching module 160 is coupled to the first antennas 111 to 11m, the second antennas 131 to 13n, the first central antennas 121, the second central antennas 141 to 14b and the RF transceiving module 140. The processing unit 150 may be an embedded controller or a central processing unit, and the processing unit 150 is coupled to the RF transceiving module 140, the switching module 160 and the physical button 170.

The processing unit 150 can transmit a switching signal SW to the switching module 160 so that the switching module 160 can selectively turn on a plurality of paths between the antennas and the RF transceiving module. For example, when the switching signal SW is corresponding to the first mode, the switching module 160 turns on the paths from the first antennas 111 to 11m and the second antennas 131 to 13n to the RF transceiving module 140, and turns off the paths from the first central antennas 121 to 12a and the second central antennas 141 to 14b to the RF transceiving module 140. Accordingly, the RF transceiving module 140 can receive and transmit the first-band signal and the second-band signal through the selected first antennas 111 to 11m and the selected second antennas 131 to 13n accordingly.

It is worth mentioning that in this invention, the user may also switch the operating mode of the wireless network device 10 in a hardware control manner or a software control manner based on actual requirements (e.g., the installation position of the wireless network device 10). For example, in one embodiment of the invention, the user may switch the wireless network device 10 to the first mode or the second mode by using the physical button 170 disposed on the device body of the wireless network device 10. The processing unit 150 can generate the switching signal SW according to a switching state of the physical button 170, so that the wireless network device 10 may be switched between the first mode and the second mode.

In another embodiment of the invention, the user may also switch the operating mode of the wireless network device 10 through a user interface displayed by the wireless network device 10. For example, the processing unit 150 is the central processing unit of the wireless network device 10. The processing unit 150 operates an operating system (e.g., an embedded system). The user can select a desired operating mode from the first mode and the second mode through a user interface of the operating system (e.g., which is displayed after the user has logged-in through the web page, etc.). In other words, the wireless network device 10 can receive a message related to the switching signal through the user interface. The processing unit 150 can then generate the switching signal SW according to the message (the selection made by the user) received from the user interface. Meanwhile, the user may also set a signal band to be used by the wireless local area network through the user interface (i.e., select use of the first-band signal or the second signal to establish the connection).

In yet another embodiment of the embodiment, the wireless network device 10 further includes a sensing module 180. The sensing module 180 may be configured to detect a radiation pattern, a connection status or a connection quality of the wireless network device 10 to generate a sensing signal. Further, the processing unit 150 can determine whether the wireless network device 10 is horizontally disposed on the ceiling or vertically disposed on the wall according to the sensing signal. That is to say, the processing unit 150 can determine an installation position of the wireless network device 10 (e.g., on the ceiling or on the wall) according to the sensing signal generated by the sensing module 180 and generate the switching signal SW according to a determination result. Accordingly, the processing unit 150 can automatically switch the wireless network device 10 to the first mode or the second mode according to a current operating status or a current environmental status of the wireless network device 10. The processing unit 150 may also transmit a control message to the RF transceiving module 140 in order to control the signal energy of the signals (e.g., the first-band signal or the second-band signal) transmitted by each of the antennas so that the combined radiation pattern may be changed into a radiation pattern with the corresponding coverage as desired by the user, but the invention is not limited to above implementation.

Figure 9A:
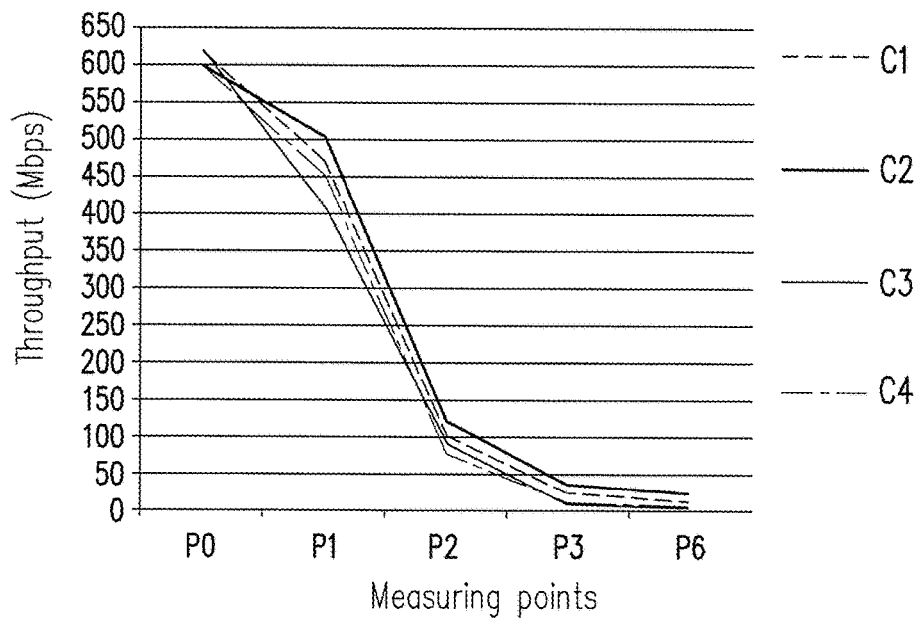
FIG. 9A and FIG. 9B are performance comparison diagrams according to one embodiment of the invention.
Figure 9B:
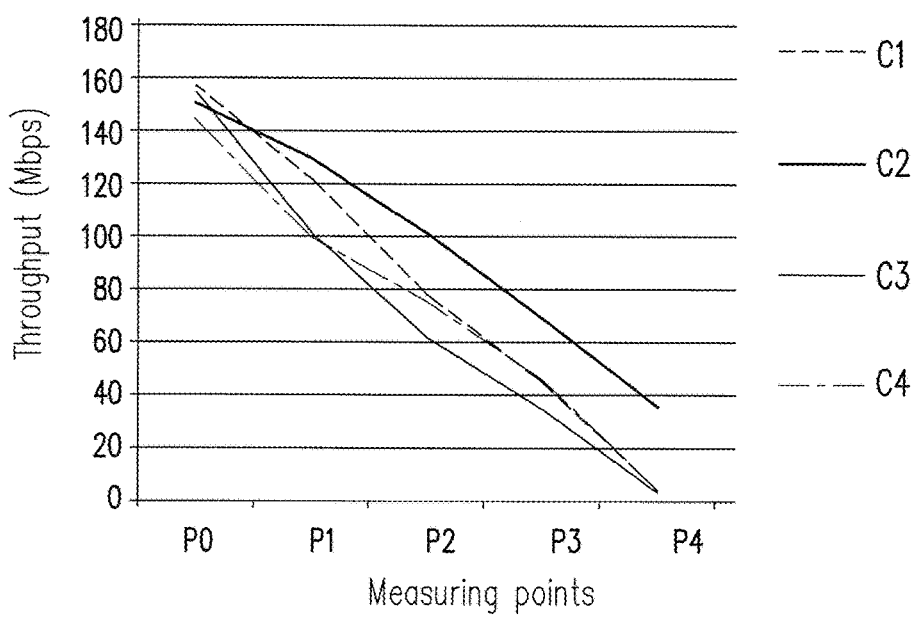

FIG. 9A and FIG. 9B are performance comparison diagrams according to one embodiment of the invention. FIG. 9A illustrates a throughput test performed by using a wireless local area network signal in WiFi 5 GHz band (corresponding to aforesaid first-band signal), wherein the throughput test may be performed by using IxChariot software and TCP packets. FIG. 9B illustrates a throughput test performed by using a wireless local area network signal in WiFi 2.4 GHz band (corresponding to aforesaid second-band signal). The conditions of the test include the followings. The wireless network device 10 in the embodiment shown by FIG. 2 is used in two different cases. In the first case, the wireless network device 10 is installed on the ceiling and uses the first mode for transceiving the signals (corresponding to a curve C1). In the second case, the wireless network device 10 is installed on the wall and uses the second mode for transceiving the signals (corresponding to a curve C2). A conventional product that also includes dual band and three antennas is used as a comparison target for the two cases. The comparison is performed by installing the comparison target on the ceiling (corresponding to a curve C3) and on the wall (corresponding to a curve C4). During the test, the wireless network device and the comparison target transmit a wireless local area network signal with the same power (e.g., a signal strength thereof is 28 dBm), and receive the wireless local area network signal with the same receiving device (i.e., a notebook computer having three antennas and capability of receiving the dual band wireless local area network signal) at different measuring points.

Horizontal axes in FIG. 9A and FIG. 9B include measuring points P0 to P6. The measuring point P0 is next to an installation position of the wireless network device and the comparison target. The measuring points P1, P2 and P3 are gradually farther away from the installation position of the wireless network device and the comparison target. The distance to the measuring points P4 and P6 are even farther away from the installation position of the wireless network device than the measuring points P1, P2 and P3. There can be obstacles (including wood compartment, stone flooring, concrete wall, etc.) inside the measurement environment. The distances from the measuring points P4 and P6 to the wireless network device are similar. Yet, there are more obstacles among a straight line path between the measuring point P6 and the wireless network device than between the measuring point P4 and the wireless network device.

Referring to FIG. 9A and FIG. 9B, no matter the signal is 5 GHz or 2.4 GHz, performances of the throughput measurement at the closer position (e.g., the measuring point P0) are not far off. However, at the farther positions, the wireless network device proposed by the invention can show a more favorable performance regardless of whether the wireless network device is installed on the wall or on the ceiling.

In summary, the invention provides a wireless network device capable of transceiving the wireless local area network signal by using the different radiation patterns. Accordingly, the user can select the optimal radiation pattern according to the installation position of the wireless network device so that the coverage of the wireless network device can satisfy the user demands while preventing the signal interference of the wireless network from affecting other electronic devices in other spaces. The wireless network device proposed by the invention can realize variations in the radiation pattern by switching the antennas. In this way, the requirements in installation and environmental application may be satisfied for most of the user without complex algorithms or high hardware cost nor sacrificing the performance.

Although the present disclosure has been described with reference to the above embodiments, it will be apparent to one of ordinary skill in the art that modifications to the described embodiments may be made without departing from the spirit of the disclosure. Accordingly, the scope of the disclosure will be defined by the attached claims and not by the above detailed descriptions.

What is claimed is:

1. A wireless network device, comprising:
   a substrate, parallel to a first plane;
   a plurality of first antennas, disposed near an edge of the substrate and having radiation patterns different from one another;
   a central antenna, disposed near a central point of the substrate; and
   a radio frequency (RF) transceiving module, coupled to the first antennas and the central antenna,
   wherein in a first mode of the wireless network device, the RF transceiving module receives and transmits a first-band signal through the first antennas, and a radiation pattern combined by the first antennas extends towards omni-direction on the first plane, and
   in a second mode of the wireless network device, the RF transceiving module receives and transmits the first-band signal through a part of the first antennas and the central antenna, and a radiation pattern combined by the part of the first antennas and the central antenna extends towards a normal line of the first plane and distributed above the first plane.

2. The wireless network device according to claim 1, wherein the radiation pattern combined by the first antennas is different from the radiation pattern combined by the part of the first antennas and the central antenna.

3. The wireless network device according to claim 1, wherein:
   a predetermined distance from the central point of the substrate to each of the first antennas is substantially the same; and
   a predetermined distance between any two adjacent first antennas is substantially the same.

4. The wireless network device according to claim 1, wherein said central antenna is a first central antenna, and the wireless network device further comprises:
   a second central antenna; and
   a plurality of second antennas, coupled to the RF transceiving module, and disposed near the edge of the substrate,
   wherein the RF transceiving module receives and transmits a second-band signal through the second antennas in the first mode of the wireless network device, and the RF transceiving module receives and transmits the second-band signal through a part of the second antennas and the second central antenna in the second mode of the wireless network device.

5. The wireless network device according to claim 4, wherein:
   a predetermined distance from the central point of the substrate to each of the second antennas is substantially the same;
   a predetermined distance between any two adjacent second antennas is substantially the same;
   an antenna type of the first antennas is different from an antenna type of the second antennas; and
   the first antennas and the second antennas are alternately disposed on the substrate.

6. The wireless network device according to claim 5, wherein:
   a frequency of the first-band signal is different from a frequency of the second-band signal;
   the first antennas are loop antennas;
   the second antennas are planar inverted-F antennas; and
   the first central antenna and the second central antennas are dipole antennas.

7. The wireless network device according to claim 1, wherein:
   the first antennas and the central antenna are dual band antennas or multi-band antennas.

8. The wireless network device according to claim 1, further comprising:
   a processing unit, coupled to the RF transceiving module,
   wherein the processing unit switches between the first mode and the second mode according to a switching signal.

9. The wireless network device according to claim 8, further comprising:
   a physical button, coupled to the processing unit, and generating the switching signal according to a switching state of the physical button.

10. The wireless network device according to claim 8, wherein the processing unit operates an operating system, receives a message from a user interface of the operating system, and generates the switching signal according to the message.

11. The wireless network device according to claim 8, further comprising a sensing module, wherein the sensing module detects a radiation pattern, a connection status or a connection quality of the wireless network device to generate a sensing signal, and the processing unit determines an installation position of the wireless network device according to the sensing signal and generates the switching signal according to a determination result.

12. The wireless network device according to claim 8, wherein the wireless network device in the first mode is ceiling mount, the wireless network device in the second mode is wall mount, and the combined radiation patterns are corresponding to different mounts based on the switching signal.

13. The wireless network device according to claim 1, wherein the wireless network device in the first mode is ceiling mount, the wireless network device in the second mode is wall mount, and the combined radiation patterns are corresponding to different mounts based on a switching signal.

* * * * *